(12) United States Patent
Böert

(10) Patent No.: US 11,980,194 B2
(45) Date of Patent: May 14, 2024

(54) DISCHARGE DEVICE FOR COMPACT FOOD MASSES, ESPECIALLY BAR MASSES OR COOKIE DOUGHS

(71) Applicant: DIOSNA Dierks & Söhne GmbH, Osnabrück (DE)

(72) Inventor: Konrad Böert, Melle (DE)

(73) Assignee: DIOSNA DIERKS & SÖHNE GMBH, Osnabrück (DE)

( * ) Notice: Subject to any disclaimer, the term of this patent is extended or adjusted under 35 U.S.C. 154(b) by 419 days.

(21) Appl. No.: 17/291,747

(22) PCT Filed: Nov. 7, 2019

(86) PCT No.: PCT/EP2019/080573
§ 371 (c)(1),
(2) Date: May 6, 2021

(87) PCT Pub. No.: WO2020/094802
PCT Pub. Date: May 14, 2020

(65) Prior Publication Data
US 2022/0022466 A1    Jan. 27, 2022

(30) Foreign Application Priority Data
Nov. 8, 2018   (EP) ..................... 18205172

(51) Int. Cl.
*A21C 1/14*   (2006.01)
*B01F 15/02*  (2006.01)
(Continued)

(52) U.S. Cl.
CPC ...... *A21C 1/1445* (2013.01); *B01F 35/75455* (2022.01); *B01F 35/7548* (2022.01); *B01F 2101/08* (2022.01)

(58) Field of Classification Search
CPC ....... B02C 18/065; B02C 18/08; B02C 18/10; B02C 18/12; A21C 1/1445; B01F 35/75455; B01F 35/7548; B01F 2101/08
See application file for complete search history.

(56) References Cited

U.S. PATENT DOCUMENTS 244,924  A  *  7/1881  Norman ................ B02C 18/065
                                                    241/199.7
1,486,328 A  *  3/1924  Fraser ............... B01F 35/75455
                                                    366/186
(Continued)

FOREIGN PATENT DOCUMENTS

DE      1 940 501 U1   6/1966
DE      24 21 104 A1   11/1975
(Continued)

OTHER PUBLICATIONS

Official Communication issued in International Patent Application No. PCT/EP2019/080573, dated May 11, 2021.
(Continued)

*Primary Examiner* — Donnell A Long
(74) *Attorney, Agent, or Firm* — Keating & Bennett, LLP

(57) ABSTRACT

The invention relates to a discharge device (1) for the portion-wise discharge of a compact food mass from a kneading vat (3) arranged in a lifting tipper (2), which device comprises at least two cutting tools (13) each having at least two cutting edges (20) for cutting through or cutting up the compact food mass.

14 Claims, 3 Drawing Sheets

Figure 1:
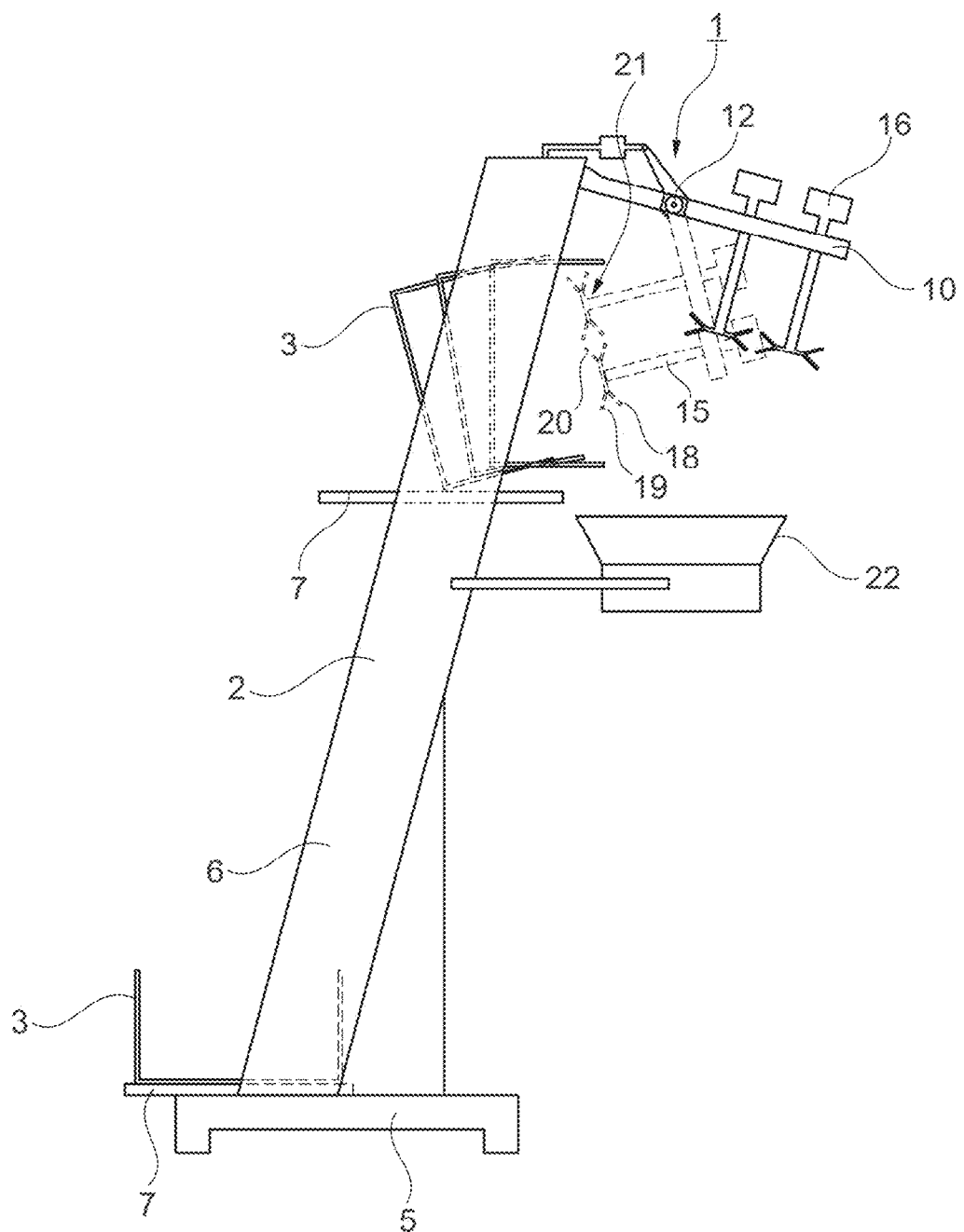

(51) Int. Cl.
    *B01F 35/75*         (2022.01)
    *B01F 101/08*      (2022.01)

(56)           References Cited

U.S. PATENT DOCUMENTS

| | | |
|---|---|---|
| 1,695,221 A | 12/1928 | Aeschbach |
| 5,605,291 A * | 2/1997 | Doskocil ................ B02C 13/04 |
| | | 241/73 |
| 2005/0018534 A1 | 1/2005 | Nikkah |
| 2010/0271900 A1 | 10/2010 | Fisson et al. |
| 2011/0235461 A1 | 9/2011 | Gürsel |

FOREIGN PATENT DOCUMENTS

| | | |
|---|---|---|
| DE | 42 09 689 C2 | 9/1993 |
| DE | 20 2010 007 274 U1 | 10/2010 |
| EP | 2 499 944 A1 | 9/2012 |
| FR | 1 180 297 A | 6/1959 |

OTHER PUBLICATIONS

English translation of Official Communication issued in International Patent Application No. PCT/EP2019/080573, dated Jan. 28, 2020.
Official Communication issued in International Patent Application No. PCT/EP2019/080573, dated Jan. 28, 2020.

\* cited by examiner

DISCHARGE DEVICE FOR COMPACT FOOD MASSES, ESPECIALLY BAR MASSES OR COOKIE DOUGHS

The present invention relates to a discharge device for discharging a compact food mass from a kneading vat having the features of the generic term of claim 1 and to a lifting tipper having such a discharge device, as well as to a method for discharging a compact food mass from a kneading vat arranged in a lifting tipper having the features of the generic term of claim 11.

Products such as cookies, gingerbread, and bars, especially protein bars, chocolate bars, muesli bars, fruit bars, cereal bars, and the like, have a highly viscous food mass that entails special requirements during processing.

Mixing and kneading machines for such highly viscous food masses mainly consist of a mobile vat of various sizes for masses from 120 to 1000 kg, into each of which a motor-driven mixing and kneading tool projects for carrying out the mixing and kneading process. After completion of the kneading process, the tool is removed and the vat is moved to a processing plant. With the aid of a lifting tipper, the vat is gripped by a lifting platform of the lifting tipper, brought to the height corresponding to the size of the lifting tipper and tilted by more than 90° so that the mass located in the vat falls into the input station of a processing device arranged below it, which may be designed as a hopper, for example. Such a lifting tipper can be found, for example, in DE 19 40 501 U1 and DE 42 09 689 C2.

Highly viscous food masses are not flowable. During the kneading process, a large food mass block is formed. This is conventionally crushed manually by operating personnel when it is discharged from the hopper in order to prepare individual smaller pieces of dough for further processing in the processing device. This is because there is a risk that the opening of the hopper will be partially or completely blocked by the mass. The processing device includes, for example, the rolling of the mass for layer-by-layer application to a conveyor belt, as is desired for multi-layer products, in particular bars or cookies.

It is the task of the present invention to provide a compact discharge device for discharging a viscous food mass from a kneading vat, which ensures safe and hygienic food mass feeding in fully automatic operation.

This task is solved by a discharge device for discharging a compact food mass from a kneading vat with the features of claim 1 and a lifting tipper with such a discharge device as well as by a method for discharging a compact food mass from a kneading vat arranged in a lifting tipper with the features of claim 11.

Advantageous embodiments and further embodiments of the invention can be taken from the dependent claims.

Compact food masses are extremely firm doughs or bar, stick or table masses which are highly viscous, block-forming and non-flowable. For example, bar masses made from dried fruits, especially date-based ones, sports bar masses enriched with proteins, and hard cookie and gingerbread doughs have such properties.

A discharge device for the portion-wise discharge of a compact food mass from a kneading vat arranged in a lifting tipper is provided, which has at least two cutting tools, each having at least two cutting edges, which are arranged to cut through, cut up or peel off a compact food mass. The compact food mass can be processed by the cutting tools so that it falls out of the vat in small portions and manual processing of the mass is no longer necessary.

It is advantageous if the at least two cutting tools each have at least one cutter head, the cutter head having the cutting edges.

Preferably, the cutting tools each have a rod, at the end of which the at least one cutter head is arranged. In one embodiment, it can be provided that the rod is a shaft that can be driven, in particular by means of an electric motor. It may also be provided that the vat is rotatable.

Advantageously, the discharge device has three cutting tools arranged at approximately the same distance from each other.

It is advantageous if the cutter heads of the cutting tools lie in a common plane.

In one embodiment, the cutter heads each have a base plate on which the bar stands orthogonally and from which at least two knives protrude in a wing-like manner, the sides of which are at least partially formed as cutting edges. Preferably, four knives are provided per cutter head.

More generally, the discharge device can have an additional retaining device that prevents excessively large pieces of dough or masses from falling out of the vat. Such a restraining device would have the advantage that the size of the discharged masses could be reliably defined. This restraining device can be, for example, a plate or a grid covering the opening of the vat. The plate or grid has defined openings that are only permeable to a certain size of dough, so that pieces that are too large cannot fall out of the vat.

The discharge device is preferably designed to be attached to a lifting tipper.

A lifting tipper with a discharge device described above is also provided. The lifting tipper can have one or two columns.

Preferably, in the case of a two-column lifting tipper, a crossbeam is provided in the upper part, on which at least one holding device of the discharge device is arranged, which carries the at least two cutting tools. It is advantageous if the at least one holding device extends vertically from the crossbeam and the at least one holding device has a swivel joint so that one end of the at least one holding device can be swiveled by means of an electric motor, wherein the at least two cutting tools are arranged on the part of the at least one holding device to be swiveled.

The discharge device with holding device can also be attached to a lifting platform of the lifting tipper.

Preferably, the holding device is set up to swing the cutting tools into a kneading vat rotatably mounted on a lifting platform of the lifting tipper. However, it is also conceivable that the insertion is linear.

The rods of the at least two cutting tools preferably extend perpendicularly from the associated holding device. However, an angle between 80 and 110 degrees, for example, is also conceivable.

The lifting tipper can also have a stripping device.

Furthermore, a method is provided for discharging a compact food mass from a kneading vat arranged in a lifting tipper, comprising the following process steps:
- Tilting the kneading vat about a tilting axis,
- Insertion of at least two cutting tools of a discharge device arranged on the lifting tipper into the kneading vat,
- Moving the cutting tools relative to a food mass in the kneading vat such that the cutting tools cut the food mass into smaller pieces,
- Increasing the tilting angle of the kneading vat so that the small pieces fall out of the kneading vat and the large pieces still present are retained,
- After completion of the discharge process, the cutting tools are moved out of the kneading vat.

Preferably, the vat is tilted first and then the discharge device is moved into the vat. However, another sequence is also possible. The insertion and removal of the cutting tools is preferably a swiveling process in which the cutting tools are swiveled in and out, in particular fully automatically.

This process allows in a simple and efficient way to adapt the size of a viscous mass discharged from a vat to the downstream processing equipment.

The relative movement can be produced by rotation of the cutting tools and/or rotation of the vat. However, it can also be provided that the cutting tools are rigid and the kneading mass moves around the cutting tools with the rotating vat.

Preferably, the cutting tools or the cutter heads of the cutting tools are designed to retain the large pieces during the tilting process.

It is advantageous if the tilting movement and the relative movement, as well as the design and the number of cutting tools are adapted to the composition of the food mass.

Preferably, the swiveling of the cutting tools into the kneading vat is load-controlled.

In order to increase the reliability of the discharge device, video monitoring can also be provided, in which the sizes of the dough masses are observed by means of image analysis and, if necessary, influence is taken on the control of the discharge device in order to avoid the discharge of pieces that are too large from the vat.

A preferred embodiment of the invention is explained in more detail below with reference to the drawings. Similar or similarly acting components are designated in the figures with the same reference signs. They show:

FIG. 1: A schematic representation of a lifting tipper with discharge device in different positions, FIG. 2: A side view of the discharge device of FIG. 1 with cutting tools, and FIG. 3: A top view of the discharge device of FIG. 2 with the lifting tipper and vat shown in simplified form.

Figure 2:
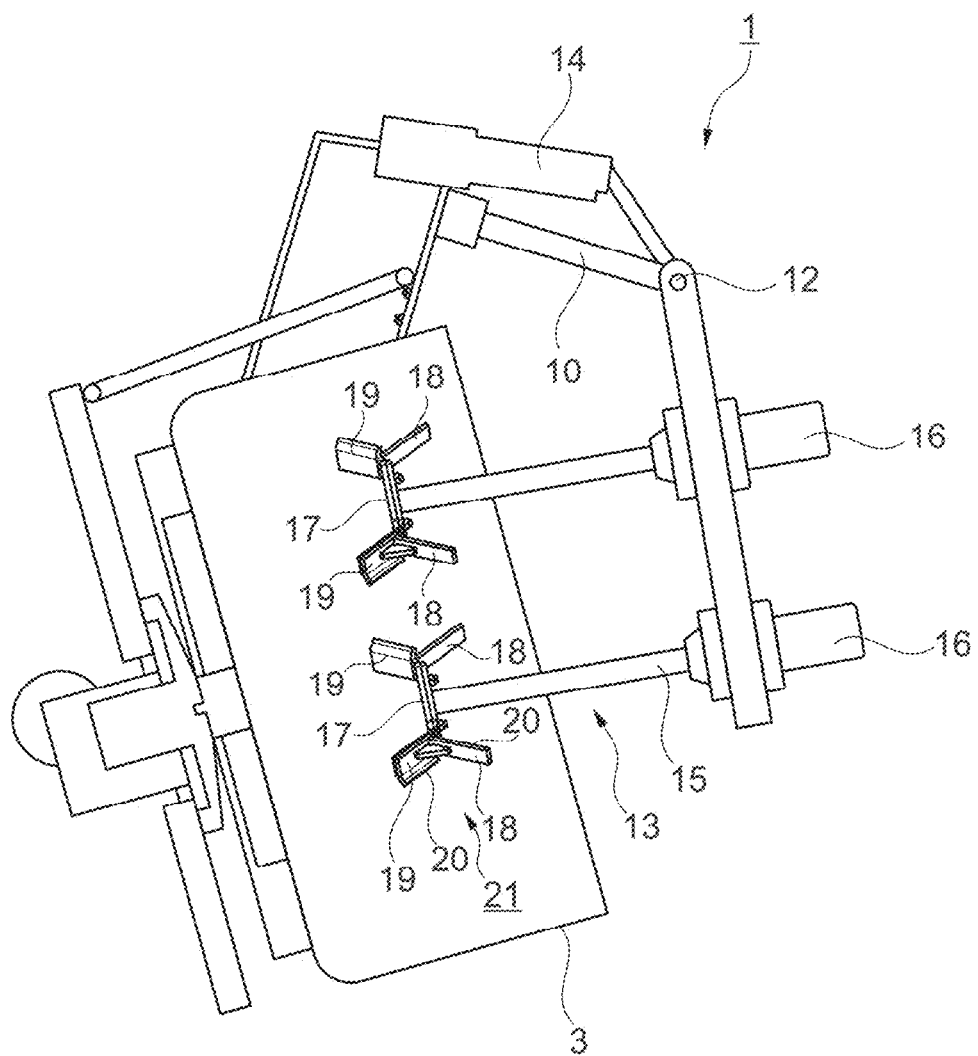
Figure 3:
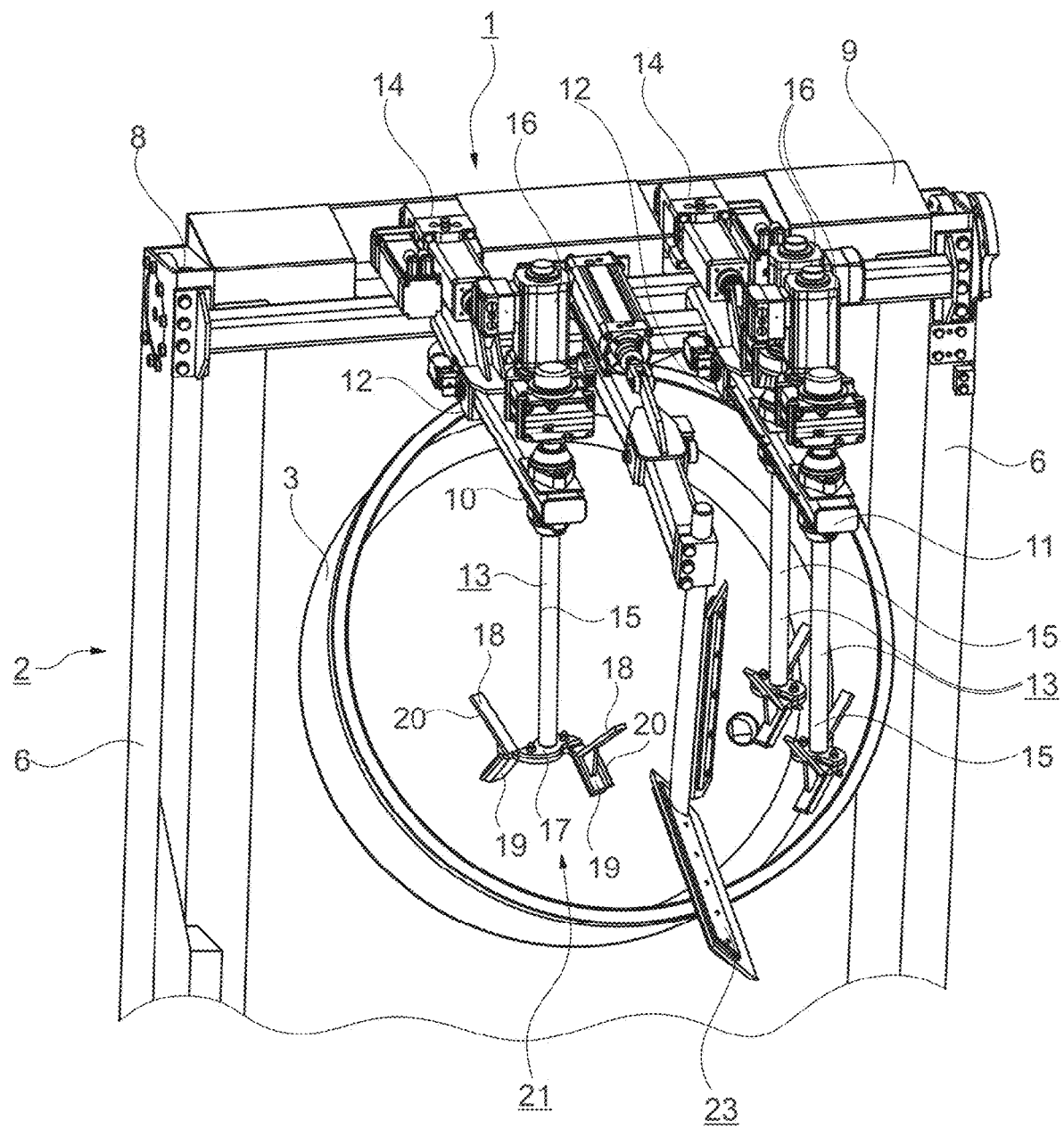

FIGS. 1 to 3 show a preferred embodiment of a discharge device 1 mounted on a lifting tipper 2. In the following, the processing of a highly viscous food dough is described. However, the discharge device is also suitable for processing highly viscous bar, stick or table masses, which is carried out analogously to dough processing.

FIG. 1 shows a lifting tipper 2 of a dough processing plant. A dough mixing and kneading machine, which is not shown, is connected upstream of the lifting tipper 2 in the production flow. This dough mixing and kneading machine comprises a vat in which the dough is formed by a motor-driven mixing and kneading tool. After completion of the kneading process, the vat is moved to the lifting tipper. FIG. 1 illustrates the lifting and tipping process of the lifting tipper. First, a vat 3 is lifted in the lifting tipper 2 and then tilted. Such lifting tippers 2 are known from the prior art in a multitude.

The base body of the lifting tipper 2 has a base plate 5 and two parallel columns 6, on the inner sides of which are guide tracks or guide rails for a lifting carriage 7. The lifting carriage 7 runs over rollers in guide tracks of the rails along a direction of travel. A lifting platform, which is not shown, is arranged on the lifting carriage 7 for load pickup and is pivotably mounted on the lifting carriage 7 by means of a pivot bearing. The vat 3 is placed on the lifting platform and can thus be tilted via the pivot bearing. The tilting axis is arranged perpendicular to the direction of travel of the lifting carriage. The tilting can be up to 120°, in particular 135°. The vat 3 is rotatably mounted on the lifting carriage. An electric motor drives the vat 3 via a gear, in particular a rolling element gear, which may be in the form of a friction gear or a gear train, which rotates about an axis of rotation that coincides with the longitudinal axis of the vat.

In the upper part of the lifting tipper 2, between the two columns 6, a rotation axis 8 is arranged, on which two not shown chain deflection wheels are arranged, on which roller chains run. In the lower or upper part of the lifting tipper is arranged a drive motor, not shown, which drives the two parallel running roller chains to which the lifting carriage 7 is attached.

The axis of rotation 8 on which the chain deflection wheels are arranged is covered by a crossbeam 9 which connects the two columns 6 with each other. The discharge device 1 is located on the crossbeam 9, comprising two tubular holding devices 10, 11, each of which has a swivel joint 12 and on which drivable cutting tools 13 are held. The two holding devices of the discharge device 10, 11 can each be pivoted about the swivel joint 12 by means of a linear drive 14. In this case, the cutting tool 13 is arranged on the pivotable part of the holding device 10,11. The linear drives 14 allow the cutting tools 13 to be swiveled into the vat 3 during the tilting process. The cutting tools 13 arranged on the holding devices 10,11 each have a shaft 15, each of which can be driven by an associated electric motor 16 via a reduction gear. The electric motors 16 are seated on the corresponding holding device 10, 11. The shafts 15 preferably extend perpendicular to the longitudinal axis of the holding device 10, 11. At the ends of the shafts remote from the motor, a base plate 17 is arranged in each case, on which the shaft 15 stands orthogonally. Four blades 18,19 project wing-like from the base plate 17, which are approximately rectangular and whose longitudinal sides form cutting edges 20. The knives 18,19 project outwardly from the shaft 15. Two of the four knives 19 are angled downward from the base plate 17, away from the shaft 15. The two other knives 18 are angled upwards from the base plate 17, towards the shaft 15. Two oppositely angled knives 18,19 form an approximately v-shaped pair of knives. In the circumferential direction around the shaft 15, the pairs of knives are formed opposite each other. The blades 18,19 extend with their longitudinal sides preferably parallel to each other. The base plate 17 and the knives 18,19 form a cutter head 21 of the cutting tool 13. The cutter head 21 is preferably formed of stainless steel. The design of the discharge device 1 and the cutting tools 13 is shown in detail in FIGS. 2 and 3.

The two holding devices 10, 11 extend parallel to each other and perpendicular to the crossbeam 9. A single cutting tool 13 is arranged on one of the holding devices 10 and two cutting tools 13 are arranged on the other holding device 11, one behind the other in the direction of the longitudinal axis of the holding device. The length of the shafts 15 of the cutting tools 13 is dimensioned in such a way that the cutter heads 21 can plunge into the vat 3 up to the immediate vicinity of the bottom. During operation, however, the cutter heads 21 should not touch either the bottom or the wall of the vat 3. The spacing of the three shafts 15 in a plane perpendicular to the longitudinal axes of the shafts 15 and the size of the cutter heads 21 are dimensioned so that the cutter heads 21 do not touch each other during operation and, if possible, act on the entire surface of the dough mass located in the vat 3. The larger the diameter of an envelope of the cutter heads 21, the better the result of the dough processing.

During the tilting process of the lifting tipper 2, the discharge device 1 is controlled in such a way that the cutting tools 13 are fed to the dough located in the vat 3 (see FIG. 1). By moving the dough relative to the cutter heads 21, the dough is moved past them and cut, peeled off and/or separated by means of the cutting edges. The dough block is thus continuously reduced in size. The separated dough mass first remains in the vat 3 and, as soon as the tipping angle is large enough, falls onto a conveyor belt arranged below the vat or into a collecting container 22. The cutter heads 21 also act as a kind of retaining device. Only when the dough mass is small enough can it pass through the space between the cutters 13 and fall out of the vat 3 when tilted appropriately. The cutting process is repeated continuously so that the dough block becomes smaller and smaller and can thus be discharged from the vat in small quantities. In subsequent processing devices, these small quantities of dough can be fed via a dough hopper. By means of the cutting tools 13, the discharge device 1 prevents excessively large lumps from being discharged, which would clog the processing device. Continuous feeding of the batch located in the vat 3 into the hopper of the processing device is possible. The arrangement of the discharge device 1 on the lifting tipper 2 creates a compact solution that makes use of existing components.

It may be provided that the relative movement is effected by rotation of the vat 3 and/or the cutting tools 13. The cutting tools 13 can rotate relative to each other in opposite directions or in the same direction. The vat 3 may also rotate in both directions and change the direction of rotation during the discharge process. The speed of the rotations of the vat 3 and the cutting tools 13 may be constant throughout the discharge process, but may also change. Control and/or regulation can be performed by means of a load applied to the electric motors of the vat 3 and/or the cutting tools 13. Frequency converters are preferably provided for this purpose. The number of cutting tools 13 is preferably greater than two. The arrangement of the cutting tools 13 on the holding device 10,11 can be adapted to the number of cutting tools 13 and the dimensioning of the cutter heads 21.

The cutter heads 21 are identical in the previously described embodiment. However, it can also be provided that the cutter heads 21 have different sizes. It can also be provided that further knives are arranged on the shaft at different heights and/or that several knives extend from the base plate, which can, for example, also be additionally angled upwards towards the shaft.

In one embodiment, it may also be provided that the cutting tools are rigidly attached to the holding device, so that they cannot rotate and the electric motors and thus additional costs can be saved.

The insertion, in particular the swiveling, of the cutting tools into the vat is preferably performed via a position control, in particular a load-controlled position control with frequency converter. This allows the insertion of the cutter heads in the vat to be optimized so that they only act on the surface of the dough and do not penetrate the dough to such an extent that blocking of the cutter heads or clumping of the cutter heads can be prevented. In addition, this ensures that the separated dough masses do not exceed a certain size.

It may also be generally provided that the dough mass discharged in small pieces from the vat falls onto a separating line. This separating line further divides the dough mass as required and serves to control the size of the discharged dough piece. The separating line can be arranged between the vat and the conveyor belt or the collecting vessel. The drop height between vat and conveyor belt or collecting vessel is preferably at least 0.5 m, in particular at least 0.8 m. The high drop height and the associated potential energy of the dough can achieve further comminution of the discharged dough mass on impact with the conveyor belt or the collecting vessel.

A correspondingly large drop height can also be provided when feeding the processing device from the conveyor belt. The dough mass falls from the conveyor belt onto the hopper and is further comminuted by the potential energy.

At the end of the tilting process, the dough has been discharged piece by piece. The discharge device is swung out of the vat. If necessary, the vat is emptied of residues and cleaned using known stripping devices 23, which are installed in a fixed position on the crossbeam of the lifting tipper.

Depending on the dough recipe, a special program is provided for the tilting process. The program controls the tipping speed and the rotation of the vat and/or the cutting tools, as well as the dipping of the cutting tools into the vat. It can also be provided that deviations of the dough parameters can be detected and a control adapts the program to the conditions.

The invention is not limited to a two-column lifting tipper. The discharge device can also be attached to a single-column lifting tipper.

More generally, the discharge device can have an additional retaining device that prevents excessively large pieces of dough or masses from falling out of the vat. Such a retaining device would have the advantage that the size of the discharged mass could be reliably defined. This retaining device can be, for example, a plate or a grid covering the opening of the vat. In this case, the plate or grid have defined openings that are only permeable to a certain size of dough, so that pieces that are too large cannot fall out of the vat. The retaining device is preferably also attached to the holding device.

In order to increase the reliability of the discharge device, video monitoring can also be provided, in which the sizes of the dough masses are observed by means of image analysis and, if necessary, influence is taken on the control of the discharge device in order to avoid the discharge of pieces that are too large from the vat.

The invention claimed is:

1. Discharge device for a kneading vat arranged in a lifting tipper, the discharge device comprising:
    at least two cutting tools which each include at least two cutting edges in order to cut through or cut up a compact food mass located in the kneading vat; wherein
    the at least two cutting tools are structured to process the compact food mass and result in predetermined sized portions falling out of the kneading vat, the predetermined sized portions being smaller than an entirety of the compact food mass.

2. Discharge device according to claim 1, wherein the at least two cutting tools each include at least one cutter head including the at least two cutting edges.

3. Discharge device according to claim 2, wherein the at least two cutting tools each include a rod at an end of which the at least one cutter head is arranged.

4. Discharge device according to claim 3, wherein the rod is a shaft which can be driven by an electric motor.

5. Discharge device according to claim 3, wherein the at least two cutting tools each include a base plate on which the rod stands orthogonally and from which at least two knives project in a wing-shaped arrangement, and sides of the at least two knives are at least partially defined as cutting edges.

6. Lifting tipper with a discharge device according to claim 1, wherein the lifting tipper is structured to be moved from and suspended above a base plate or a lifting platform.

7. Lifting tipper according to claim 6, wherein an upper portion of the lifting tipper includes a crossbeam on which at least one holding device of the discharge device is arranged, which holds the at least two cutting tools.

8. Lifting tipper according to claim 7, wherein the at least one holding device extends perpendicularly from the crossbeam and that the at least one holding device includes a swivel joint so that one end of the at least one holding device can be swiveled by an electric motor, the at least two cutting tools being arranged on a portion of the at least one holding device which is swiveled.

9. Lifting tipper according to claim 7, wherein the at least one holding device is set up to pivot the at least two cutting tools into the kneading vat rotatably mounted on a lifting platform of the lifting tipper.

10. Lifting tipper according to claim 6, wherein the lifting tipper includes a stripping device.

11. Method for discharging a compact food mass from a kneading vat arranged in a lifting tipper, the method comprising:
   tilting the kneading vat about a tilting axis;
   inserting at least two cutting tools of a discharge device arranged on the lifting tipper into the kneading vat;
   moving the at least two cutting tools relative to the compact food mass located in the kneading vat in such a way that the at least two cutting tools cut the food mass into smaller pieces;
   increasing a tilting angle of the kneading vat in such a way that the smaller pieces fall out of the kneading vat and larger pieces which are still present are retained in the kneading vat; and
   after completion of a discharging process, removing the at least two cutting tools from the kneading vat.

12. Method according to claim 11, wherein the at least two cutting tools are structured to retain the large pieces during the tilting.

13. Method according to claim 11, wherein the tilting and the moving, as well as a structure and a number of the at least two cutting tools, are adapted to a composition of the compact food mass.

14. Method according to claim 11, wherein the inserting of the at least two cutting tools into the kneading vat is load-controlled.

* * * * *